US010664404B2

(12) United States Patent
Li et al.

(10) Patent No.: US 10,664,404 B2
(45) Date of Patent: May 26, 2020

(54) USER INTERFACE STATE TRANSITIONS (71) Applicant: SAP SE, Walldorf (DE)

(72) Inventors: Jianzhong Li, Shanghai (CN); Yonggao Pan, Shanghai (CN); Jing Zhao, Shanghai (CN); Shangtong Zhang, Shanghai (CN); Ke Lu, Shanghai (CN); Liangyi Zhang, Shanghai (CN)

(73) Assignee: SAP SE, Walldorf (DE)

( * ) Notice: Subject to any disclaimer, the term of this patent is extended or adjusted under 35 U.S.C. 154(b) by 473 days.

(21) Appl. No.: 15/066,428

(22) Filed: Mar. 10, 2016

(65) Prior Publication Data

US 2017/0228238 A1    Aug. 10, 2017

Related U.S. Application Data (60) Provisional application No. 62/291,396, filed on Feb. 4, 2016.

(51) Int. Cl.
G06F 9/451      (2018.01)
G06F 12/0871    (2016.01)

(52) U.S. Cl.
CPC .......... *G06F 12/0871* (2013.01); *G06F 9/451* (2018.02); *G06F 2212/604* (2013.01)

(58) Field of Classification Search
CPC ............................... G06F 9/4443; G06F 9/451
See application file for complete search history.

(56) References Cited

U.S. PATENT DOCUMENTS

| 5,333,302 | A  | * | 7/1994  | Hensley    | G06F 11/3414 |
|           |    |   |         |            | 703/22       |
| 5,826,253 | A  | * | 10/1998 | Bredenberg | G06F 12/0815 |
| 6,184,880 | B1 | * | 2/2001  | Okada      | G06F 9/45512 |
|           |    |   |         |            | 714/E11.217  |
| 6,222,537 | B1 | * | 4/2001  | Smith      | G06F 8/38    |
|           |    |   |         |            | 715/762      |
| 6,357,038 | B1 | * | 3/2002  | Scouten    | G06F 9/45512 |
|           |    |   |         |            | 717/122      |
| 6,424,354 | B1 | * | 7/2002  | Matheny    | G06F 3/0481  |
|           |    |   |         |            | 345/619      |
| 6,535,912 | B1 | * | 3/2003  | Anupam     | G06F 17/30884|
|           |    |   |         |            | 707/E17.114  |
| 6,549,216 | B1 | * | 4/2003  | Schumacher | G06F 9/45512 |
|           |    |   |         |            | 714/E11.193  |

(Continued)

*Primary Examiner* — Phenuel S Salomon
(74) *Attorney, Agent, or Firm* — Mintz Levin Cohn Ferris Glovsky and Popeo, P.C.

(57) ABSTRACT

Methods and apparatus, including computer program products, are provided for monitoring user interface state transitions. In one aspect, there is provided a method. The method may include monitoring a plurality of operations performed at a user interface; recording, at a cache, the plurality of operations, each of the recorded plurality of operations having a predefined format including a value and a target; moving, in response to a first request to move to a prior state at the user interface, back in the cache to determine the prior state at the user interface; and moving, in response to a second request to move to a subsequent state at the user interface, forward in the cache to determine the subsequent state at the user interface. Related apparatus, systems, methods, and articles are also described.

11 Claims, 6 Drawing Sheets

(56) References Cited

U.S. PATENT DOCUMENTS

| | | | | | |
|---|---|---|---|---|---|
| 6,633,878 | B1* | 10/2003 | Underwood | | G06Q 10/10 |
| 6,954,859 | B1* | 10/2005 | Simerly | | G08B 13/19604 |
| | | | | | 348/E7.086 |
| 7,013,329 | B1* | 3/2006 | Paul | | H04M 3/42178 |
| | | | | | 709/217 |
| 7,099,893 | B2* | 8/2006 | Bischof | | G06F 11/3688 |
| | | | | | 707/737 |
| 7,275,240 | B2* | 9/2007 | Cole | | G06F 8/51 |
| | | | | | 717/121 |
| 7,461,342 | B2* | 12/2008 | McLean | | G06F 9/45512 |
| | | | | | 704/207 |
| 7,685,248 | B1* | 3/2010 | Fein | | H04W 4/02 |
| | | | | | 709/212 |
| 7,712,074 | B2* | 5/2010 | Ren | | G06F 9/451 |
| | | | | | 717/105 |
| 8,407,574 | B2* | 3/2013 | Forstall | | G06F 17/30899 |
| | | | | | 715/200 |
| 8,433,996 | B2* | 4/2013 | Paulsami | | G06F 17/30876 |
| | | | | | 715/205 |
| 8,667,421 | B2* | 3/2014 | Grunberger | | G06F 9/451 |
| | | | | | 715/854 |
| 2003/0112271 | A1* | 6/2003 | Batalden | | G06F 17/30905 |
| | | | | | 715/744 |
| 2003/0164850 | A1* | 9/2003 | Rojewski | | G06F 17/30899 |
| | | | | | 715/733 |
| 2003/0169264 | A1* | 9/2003 | Emerson | | G06F 3/1462 |
| | | | | | 345/547 |
| 2004/0111488 | A1* | 6/2004 | Allan | | G06F 17/30899 |
| | | | | | 709/217 |
| 2004/0221262 | A1* | 11/2004 | Hampapuram | | G06F 8/33 |
| | | | | | 717/113 |
| 2004/0261026 | A1* | 12/2004 | Corson | | G06F 9/45512 |
| | | | | | 715/704 |
| 2005/0034148 | A1* | 2/2005 | Jaeger | | G06F 3/0481 |
| | | | | | 725/14 |
| 2005/0278728 | A1* | 12/2005 | Klementiev | | G06F 9/45512 |
| | | | | | 719/328 |
| 2006/0010420 | A1* | 1/2006 | Peterson | | G11B 27/034 |
| | | | | | 717/106 |
| 2006/0224960 | A1* | 10/2006 | Baird-Smith | | G06F 17/30876 |
| | | | | | 715/700 |
| 2009/0112949 | A1* | 4/2009 | Ergan | | G06F 12/0802 |
| 2009/0172582 | A1* | 7/2009 | Miyawaki | | G06F 11/3476 |
| | | | | | 715/770 |
| 2009/0199096 | A1* | 8/2009 | Pop-Jordanov | | G06F 11/3692 |
| | | | | | 715/704 |
| 2010/0077329 | A1* | 3/2010 | Korn | | G06F 3/0481 |
| | | | | | 715/764 |
| 2010/0131927 | A1* | 5/2010 | Pinjala | | G06F 9/451 |
| | | | | | 717/125 |
| 2010/0241479 | A1* | 9/2010 | Chaushev | | G06Q 10/06 |
| | | | | | 705/7.15 |
| 2010/0306665 | A1* | 12/2010 | Milic-Frayling | | G06F 17/30873 |
| | | | | | 715/738 |
| 2011/0004868 | A1* | 1/2011 | Bharadwaj | | G06F 11/3676 |
| | | | | | 717/135 |
| 2011/0041117 | A1* | 2/2011 | Grechanlk | | G06F 8/34 |
| | | | | | 717/104 |
| 2012/0131456 | A1* | 5/2012 | Lin | | G06F 11/3672 |
| | | | | | 715/704 |
| 2013/0019171 | A1* | 1/2013 | Mounty | | G06F 11/3688 |
| | | | | | 715/704 |
| 2013/0061159 | A1* | 3/2013 | Tseng | | G06F 17/30873 |
| | | | | | 715/760 |
| 2013/0159784 | A1* | 6/2013 | Rossi | | G06F 11/3684 |
| | | | | | 714/47.1 |
| 2013/0290875 | A1* | 10/2013 | Dixit | | G06F 11/3664 |
| | | | | | 715/760 |
| 2014/0059113 | A1* | 2/2014 | Adams | | H04L 12/1895 |
| | | | | | 709/203 |
| 2014/0237389 | A1* | 8/2014 | Ryall | | H04L 65/403 |
| | | | | | 715/753 |
| 2016/0026730 | A1* | 1/2016 | Hasan | | G06F 16/986 |
| | | | | | 715/234 |
| 2016/0336023 | A1* | 11/2016 | Guyott | | G10L 21/0364 |
| 2017/0060368 | A1* | 3/2017 | Kochura | | G06F 9/451 |
| 2017/0060713 | A1* | 3/2017 | Wang | | G06F 11/2236 |
| 2017/0132511 | A1* | 5/2017 | Gong | | G06N 3/0454 |
| 2017/0286191 | A1* | 10/2017 | Israeli | | G06F 9/542 |
| 2017/0300196 | A1* | 10/2017 | Simpson | | G06F 3/0482 |

\* cited by examiner

\*externalCode :  slardarOBJ externalName :  name1 gold :  123

*externalCode : stardarOBJ externalName : name2 gold : 123

*externalCode : stardarOBJ externalName : name2 gold : 1,235

*externalCode : slardarOBJ externalName : name3 gold : 1,235

FIG. 3D

USER INTERFACE STATE TRANSITIONS

FIELD

The present disclosure generally relates to data processing and, in particular, user interfaces.

BACKGROUND

User interfaces provide a way to present information and allow interactions between an application and a user. For example, the user interface may be implemented as a browser, a client application, and/or a graphical user interface. The user interface can be used to present data, enter data, and/or provide other interactions with an application. In the age of cloud-based applications, the user interface has become a primary mechanism for the user to interact with a backend application hosted at a server, such as a cloud server.

SUMMARY

Methods and apparatus, including computer program products, are provided for monitoring user interface state transitions.

In one aspect, there is provided a method. The method may include monitoring a plurality of operations performed at a user interface; recording, at a cache, the plurality of operations, each of the recorded plurality of operations having a predefined format including a value and a target; moving, in response to a first request to move to a prior state at the user interface, back in the cache to determine the prior state at the user interface; and moving, in response to a second request to move to a subsequent state at the user interface, forward in the cache to determine the subsequent state at the user interface.

In some implementations, the above-noted aspects may further include additional features described herein including one or more of the following. The controller at the user interface may monitor the plurality of operation being performed. The controller may include a plurality of event listeners at a plurality of user interface elements. The event listener may provide the monitored plurality of operations to the cache. The cache may include an array where the plurality of operations are stored. The target may represent a user interface element, the value being entered into the user interface element. A first operation stored in the cache and a second, subsequent operation stored in the cache may be compress by ignoring and/or deleting the first operation stored in cache, when the first operation does not affect a final value of the corresponding target. The moving back in the cache to determine the prior state at the user interface may occur after the compressing. The moving forward in the cache may occur after the compressing.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

DESCRIPTION OF THE DRAWINGS

In the drawings.

Like labels are used to refer to same or similar items in the drawings.

DETAILED DESCRIPTION

User interfaces have become increasingly complex and, as such, allow a user to perform relatively complex edits to what is presented via a user interface. Each edit represents a state of the user interface at any given instance in time. Thus, it is becoming increasingly complex to track and move between states at a user interface as the operations performed at the user interface have become increasingly complex. To that end, there is provided a way of monitoring the state of a user interface, in accordance with some example embodiments.

As noted, users may want to perform complicated edits at a user interface. Thus, the user interface may have many states due to these changes or edits. It is quite often the case that a user may want to jump between these states. However, traditional solutions may be inefficient—wasting precious computing and memory resources. The subject matter disclosed herein may provide a way to support efficient monitoring of user interface state transitions. To that end, instead of only storing the final state of a user interface, each of the operations at the user interface may be monitored and recorded. Each operation may be stored in a cache as a record. Each record may include a value and a target associated with the operation. The value may be any type of value or action that is provided or input at the user interface (for example, a numerical value, action such as click, and/or the like). The target may be a target of the operation performed at the user interface such as a user interface element or field at the user interface (e.g., a document object model, control element, text entry field, or other user interface element).

Figure 1:
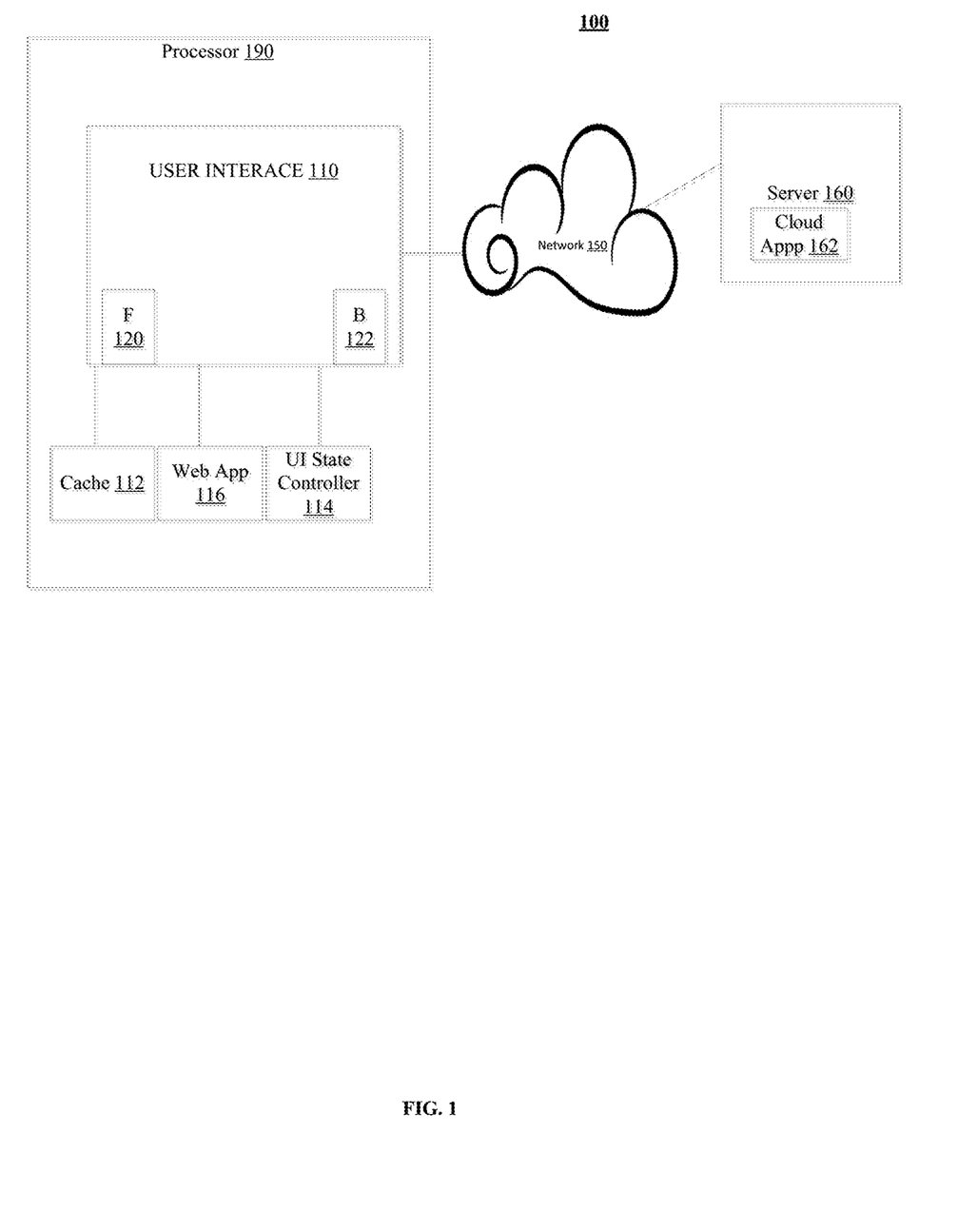
FIG. 1 depicts an example of a system for monitoring user interface operations, in accordance with some example embodiments.

FIG. 1 depicts an example of a system 100 for recording operations at a user interface, in accordance with some example embodiments.

The system 100 may include a user interface 110, such as a browser or other type of user interface that can be generated and presented at a display. For example, the user interface may be a client application, browser, and/or the like associated with a web application 116 or a corresponding cloud-based application 162 accessible via network 150 at server 160. As a change occurs at the user interface 110 due to for example entering data into a user interface element, deleting data from a user interface element, updating data at a user interface element, moving data at the user interface element an element, and/or any other action, the change may represent a state change at the user interface 110. In addition, as noted above, these state changes may be monitored and recorded as records to enable stepping through the records to determine the prior states of the user interface 110.

In the example of FIG. 1, the system may include a processor 190, such as a computer, a tablet, a smartphone, and/or the like, as well as other components, such as a display and the like. The processor 190 may comprise at least one processor and at least one memory including program code, and the processor 190 may include a web application 116 downloaded via a wireless or wired channel from a server 160 via network 150. The web application 116 may be the processor-side portion of a cloud-based service or application 162 hosted at server 160. For example, launching web application 116 may trigger generation of user interface 110, where information can be presented and displayed to enable interaction between application 116 (and/or its user at user interface 110) and the server 160 including application 162.

In some example embodiments, as changes are made to a user interface view (or the user interface elements therein) being displayed at user interface 110, those changes are monitored by user interface (UI) state controller 114. Those changes may then be recorded as records in cache 112. Once recorded, the UI state controller 114 may compress the records in cache 112 by for example combining and/or deleting records. Moreover, the UI state controller 114 may record the records in a predefined format at cache 112. If a back command 122 is received, the UI state controller 114 may provide a prior state of the UI 110 by stepping back to a prior record stored in cache. For example, if operations 1, 2, 3 and so forth are performed at the user interface 110, the UI state controller 114 may record the operations as records at cache 112. In this example, when a back command 122 is received, it triggers UI state controller 114 to step back from operation 3 (which in this example is a current state) to prior operation 2. The moving back may cause the prior state, such as prior state 2, to be displayed at user interface 110 and/or provided as a file to another application, such as web application 116, cloud application 162, and/or the like. While UI state controller 114 is in prior state 2, the selection of the forward command 120 may also cause the UI state controller 114 to move forward in the operations records in cache from state 2 to subsequent state 3, for example. Moreover, this forward step in state may trigger the next state, such as state 3, to be displayed at user interface 110 and/or provided as a file to another application, such as web application 116, cloud application 162, and/or the like.

Figure 2:
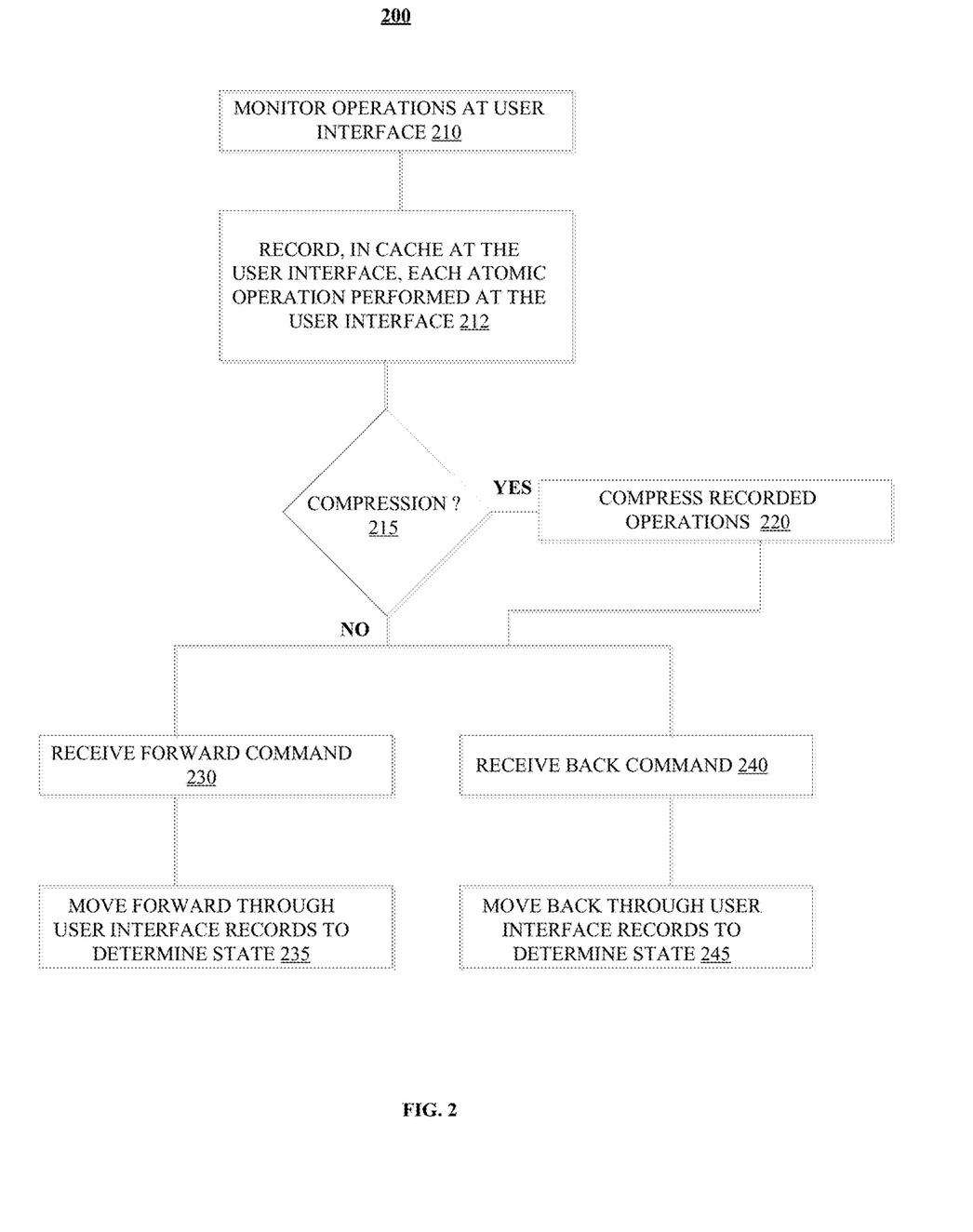
FIG. 2 depicts an example of a process for monitoring user interface operations, in accordance with some example embodiments.

FIG. 2 depicts an example process 200 for monitoring user interface states, in accordance with some example embodiments. The description of FIG. 2 also refers to FIG. 1.

Figure 3A:
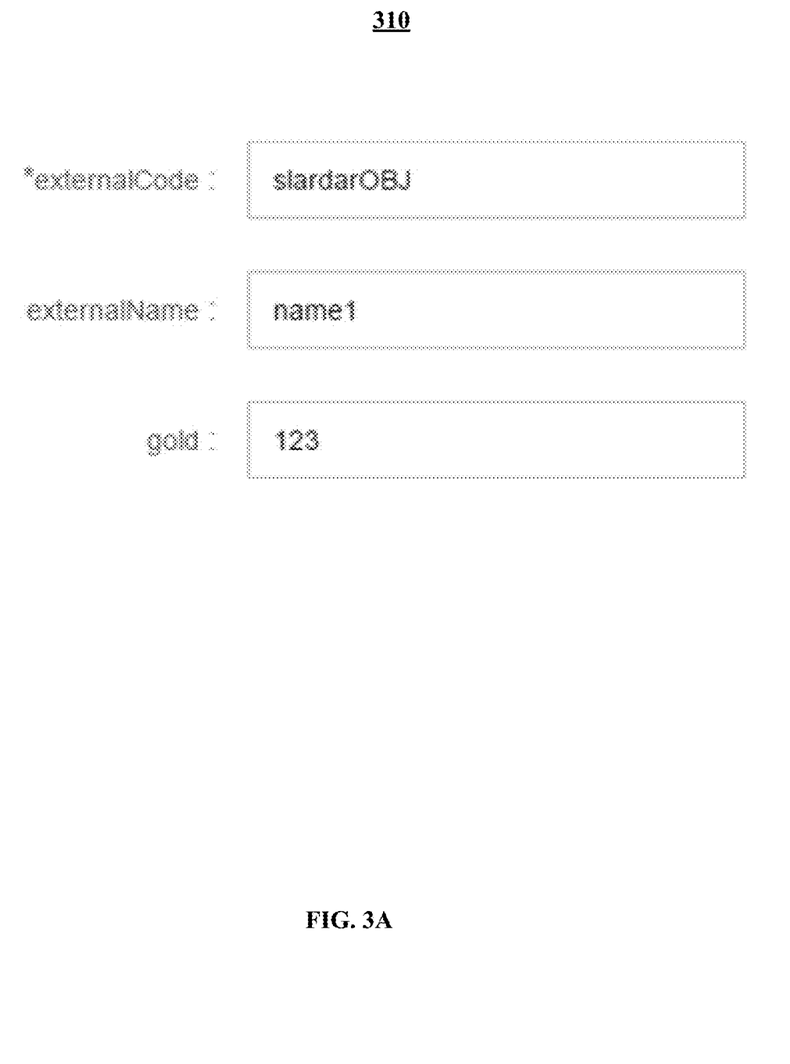
FIGS. 3A-3D depict examples of a user interface being monitored, in accordance with some example embodiments.
Figure 3B:
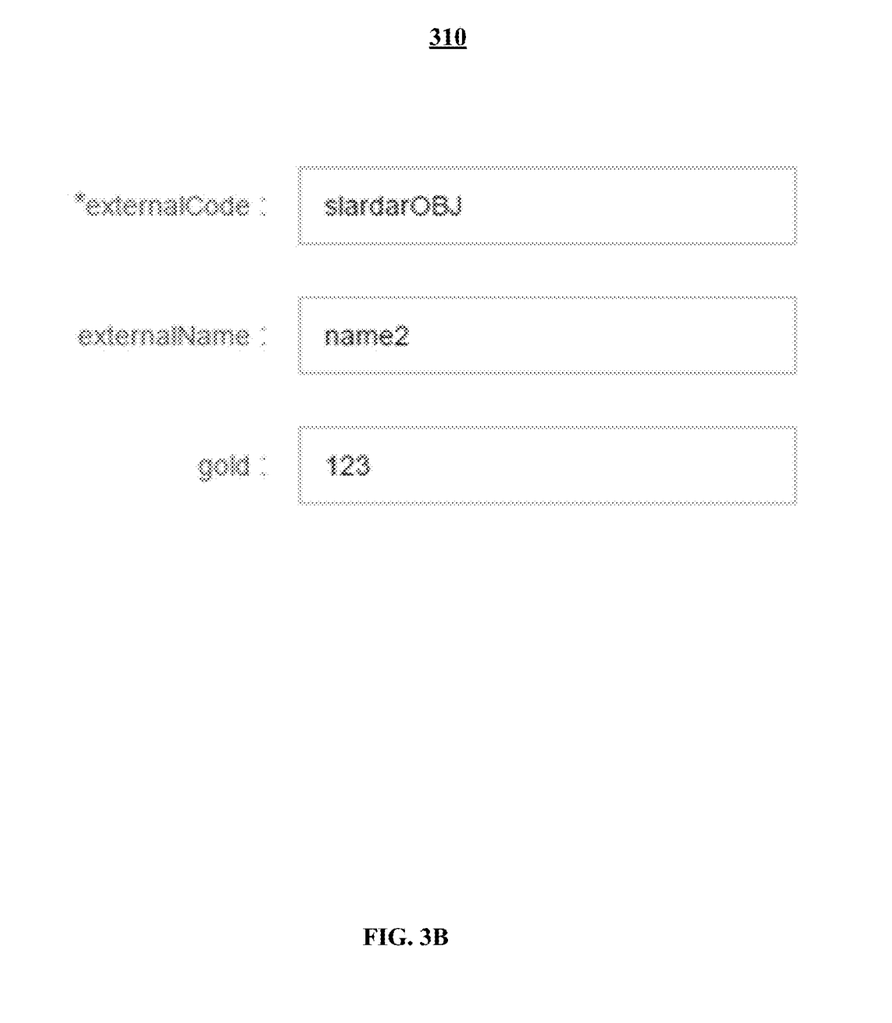

At 210, operations at a user interface may be monitored. For example, UI state controller 114 may monitor any operations being performed at user interfaces, such as text entry, deletions, selections, mouse clicks, copies, pastes, and/or any other actions including operations. FIG. 3A depicts an example user interface 310 at for example state zero (0). In this example, a text string "slardarOBJ" is input into the user interface element for external code, a text string "name1" is input into the user interface element for external name, and a text string "123" is input into the user interface element for gold. These operations are monitored by UI state controller 114. FIG. 3B depicts user interface 310 at for example state one (1), after a text string "name1" (at FIG. 3A) is changed to "name 2," which is also monitored by UI state controller 114. In some example embodiments, an event listener may be configured at every user interface element (or its corresponding field such as a drop down selection element or input field of a web page). When this is the case, whenever a value associated with a target user interface element is changed, the event listener may send a notification to the controller 114. Alternatively or additionally, the event listener may format a record for each monitored operation in a predetermined format (which may include a target and value), and then provide that formatted record to the UI state controller 114 and/or cache (where the record can be stored).

In some example embodiments, the UI state controller 114 may monitor atomic operations, which are operations that cannot be subdivided. For example, an atomic operation may comprise entering data into a text input user interface element of a web page. To illustrate further, a user enters "abc" then deletes "c" and later enters "c". Here, we have 3 atomic operations corresponding to (1) the entry of "abc", the (2) the deletion of "c" and (3) the re-entry of "c." Each of these atomic operations may be monitored and formatted in a record that is stored in cache 112. Moreover, the monitoring at 210 may be continuous, periodic, and/or aperiodic so that any operations performed at the user interface are captured as part of the controller's 114 monitoring.

At 212, each operation may be recorded in cache. For example, the UI state controller 114 may record the monitored operations as records at cache 112. In some example embodiments, each monitored operation is recorded as a record having a predetermined format. The predetermined format may include a value field of the operation and a target field. In some example embodiments, the cache 112 is configured as an array. The record (representing the atomic operation, for example) may be accessed via an index that points to a location in the array. Moreover, the cache 112 may be stored in memory along with the browser.

Figure 3C:
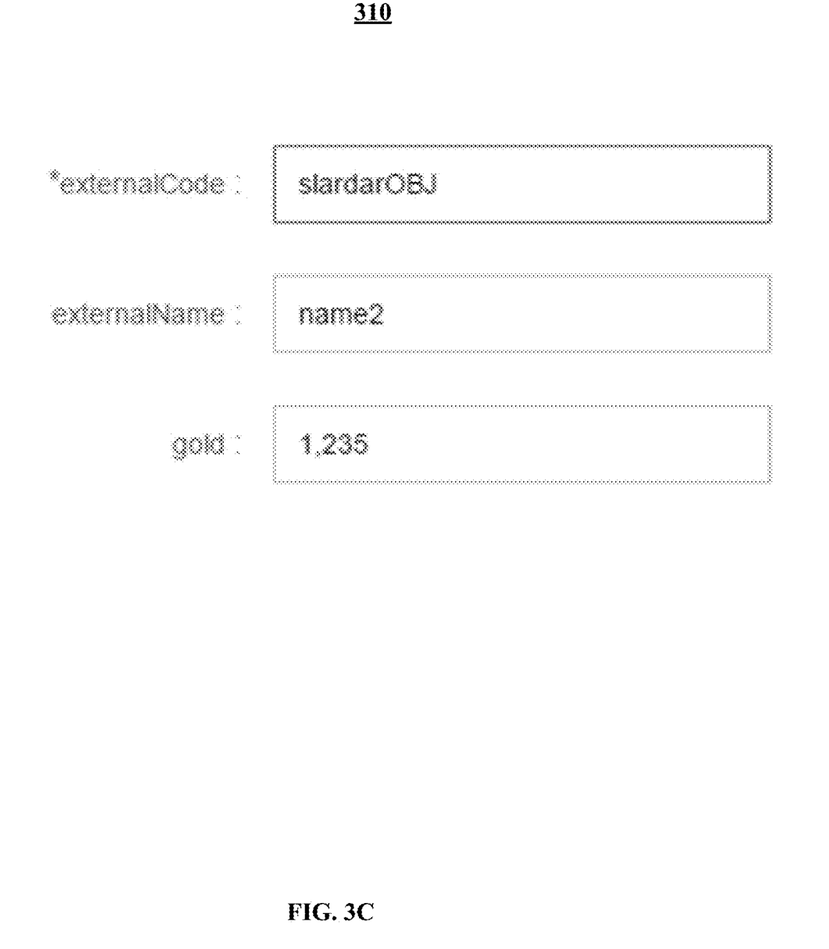
Figure 3D:
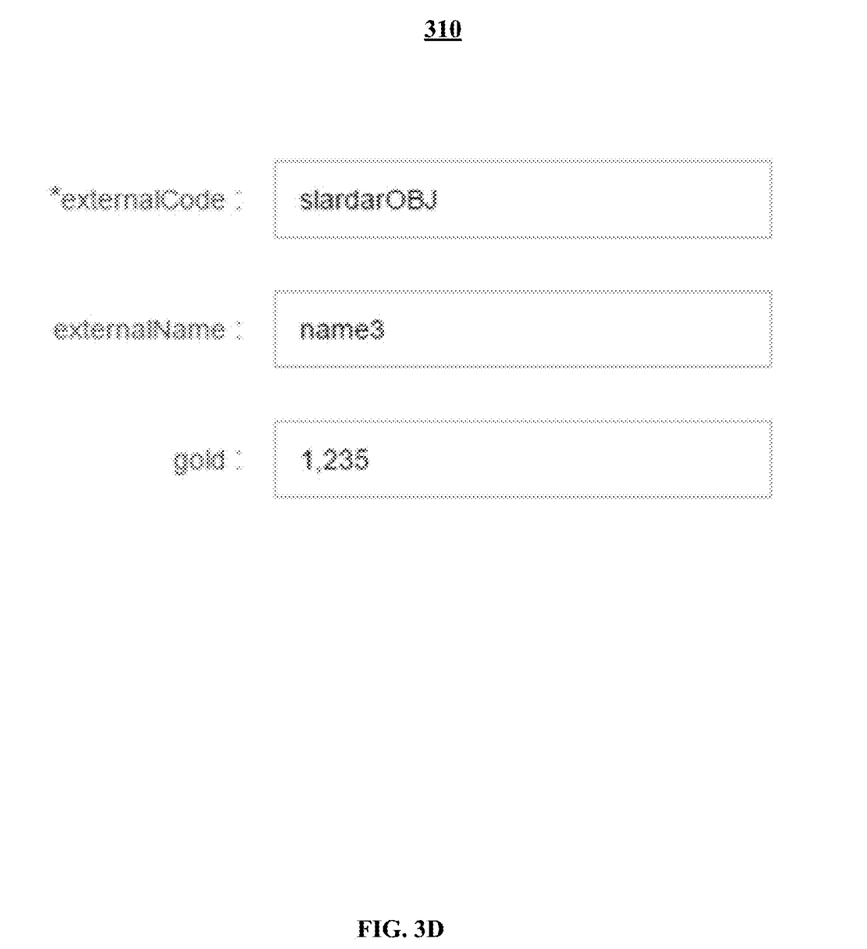

Referring again to FIGS. 3A and 3B, the target of the atomic operation may be the field external name, while the value is (name1, name2), so the record stored in cache 112 takes the following form: externalName (name1, name2). FIG. 3C depicts user interface 310 at for example state two (2), after a text string at the gold field changes from 123 to 1,235. In this example, the target corresponds to the field gold, while the value is (123, 1,235), so the record takes the following form: gold (123, 1,235). FIG. 3D depicts the user interface 310 at state three (3). In state 3, the external name field changes from name2 to name3, so the record takes the following form: externalName (name2, name3). Table 1 below shows a summary of the records that may be stored in cache 112 for the records of the FIG. 3A-3D example.

TABLE 1

| State | Record |
|---|---|
| 0 | AO0: externalCode (slardarOBJ) externalName (name1, name2) gold (123) |
| 1 | AO1: externalName (name1, name2) |
| 2 | AO2: gold (123, 1,235) |
| 3 | AO3: externalName (name2, name3). |

The UI state controller 114 may determine whether any of the records should be compressed, in which case UI state controller 114 may combine, ignore, and/or remove one or more records stored in cache 112 (yes at 215 and 220).

Referring to Table 1, there may be a first atomic operation, AO1, and a second, subsequent atomic operation, AO3 and both atomic operations in this example modify the same field, such as external name. In this example, the UI state controller 114 can compress AO1 and AO3 by ignoring AO1. To compress, the UI state controller 114 may remove a record for a given atomic operation if the atomic operation has no effect on the final state. For example, in Table 1, AO1 does not have any effect on final state. Specifically, the final external name will be "name3" because AO3 sets it to "name3" no matter what AO1 sets it to. In fact, AO1 sets it to "name2" but AO3 later overrides that change to "name2" to "name3." As such, the compression can ignore or delete the record for AO1.

In some example embodiments, the UI state controller 114 may have a configurable compression algorithm. For example, the server 160 may indicate to the UI state controller 114 which compression algorithm to use to reduce the quantity of records for a given session at the user interface. To compress, the UI state controller 114 may process the array of records, and if two atomic operations, such as AOx and AOy, have the same targets and AOy occurs later in time, the earlier atomic operation, AOx, may be ignored. Alternatively or additionally, the user interface 110 may prompt a selection (by for example the user) of a compression algorithm that will be used by the UI state controller 114 to reduce the quantity of records processed for a given session at the user interface. Alternatively or additionally, the web application 116 may select a compression algorithm to use to reduce the quantity of records for a given session at the user interface.

In some example embodiments, the UI state controller 114 may automatically compress by combining AO1 and AO3 (as shown in Table 1, for example) to form a temporary atomic operation record, AO-temp, of the form external field name (name1, name3). In this example, processing yields two AOs: (1) AO2: gold(123, 1,235) and (2) AOtemp: external name(name1, name3). As such, AOtemp can be stored in cache 112 and later rolled back (or undone so to speak).

Referring again to Table 1, it shows four states. In this example, a first selection of the back user interface element 122, triggers the UI state controller to move back (in the cached records of the operations) to a prior state 2; a second selection of the back user interface element 122, triggers the UI state controller to move back to a prior state 1; and a third selection of the back user interface element 122, triggers the UI state controller to move back to a prior state 0.

At 230, the UI state controller 114 may receive a command to move forward. For example, the command may be received from the user interface triggered by a selection of user interface element 120, although the forward command may be received or triggered in other ways (for example, by application 116, application 162, and/or the like). When UI state controller 114 receives the forward command, the UI may move or step forward, at 235, from a given state in the cache to another state. Referring to Table 1, the forward command may trigger the UI state controller 114 to move from state 2 (AO2: gold (123, 1,235)) to state 3 (AO3: externalName (name2, name3)). In this example, the external name would change from name2 to name3 as part of the forward step.

At 240, the UI state controller 114 may receive a command to move back. For example, the command may be received from the user interface triggered by a selection of user interface element 122, although the forward command may be received or triggered in other ways (for example, by application 116, application 162, and/or the like). When UI state controller 114 receives the back command, the UI may move step back, at 245, from a given state in the cache to another state. Referring to Table 1, the back command may trigger the UI state controller 114 to move from state 3 (AO3: externalName (name2, name3)) to state 2 (AO2: gold (123, 1,235)). In this example, the gold field would change from 123 to 1,235 as part of the back step.

Without in any way limiting the scope, interpretation, or application of the claims appearing herein, a technical effect of one or more of the example embodiments disclosed herein may include enhanced monitoring and control of user interface states.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein does not require the particular order shown, or sequential order, to achieve desirable results. In addition, other processing attributes other than threads can be used to determine whether to selectively change the speed of a core scheduled to process the corresponding tasks. Moreover, the term task can be construed, unless explicitly stated otherwise, to include jobs and other broader groupings of related computing activities. Other embodiments may be within the scope of the following claims.

What is claimed:

1. A method comprising:
monitoring, by a user interface controller, a plurality of user interface operations performed at a user interface, wherein the user interface controller comprises a plurality of event listeners, wherein each event listener of the plurality of event listeners is associated with a user interface element of the user interface, and wherein the monitoring comprises producing, by the plurality of event listeners and in response to state changes at each associated user interface element, the plurality of user interface operations;
recording, at a cache, the plurality of user interface operations, each of the recorded plurality of user interface operations having a predefined format including a value and a target;
receiving, at a user interface controller and from a remote server, an indication of a type of compression algorithm for compressing the plurality of user interface operations stored in the cache;
compressing, in response to the received indication, a first user interface operation of the plurality of user interface operations stored in the cache and a second, subsequent user interface operation of the plurality of user interface operations stored in the cache by deleting the first user interface operation when the first user interface operation does not affect a final value of a corresponding target;
moving, in response to a first request triggered by a first selection at the user interface to move to a prior display state at the user interface, back in the cache to determine a prior state for presentation at the user interface, wherein the prior state for presentation at the user interface comprises one of the plurality of user interface operations stored in the cache, and wherein the moving back in the cache to determine the prior state for presentation at the user interface occurs after the compressing; and
moving, in response to a second request triggered by a second selection at the user interface to move to a subsequent display state at the user interface, forward in the cache to determine a subsequent state for presentation at the user interface, wherein the subsequent state for presentation at the user interface comprises one of the plurality of user interface operations stored in the cache, and wherein the moving forward in the cache to determine the subsequent state for presentation at the user interface occurs after the compressing.

2. The method of claim 1, wherein the user interface controller monitors the plurality of user interface operations being performed.

3. The method of claim 1 further comprising:
providing, by an event listener, the monitored plurality of user interface operations to the cache.

4. The method of claim 1, wherein the cache comprises an array where the plurality of user interface operations are stored.

5. The method of claim 1, wherein the target represents a user interface element, the value being entered into the user interface element.

6. A system comprising:
at least one processor; and
at least one memory including program code which when executed by the at least one processor causes operations comprising:
monitoring, by a user interface controller, a plurality of user interface operations performed at a user interface, wherein the user interface controller comprises a plurality of event listeners, wherein each event listener of the plurality of event listeners is associated with a user interface element of the user interface, and wherein the monitoring comprises producing, by the plurality of event listeners and in response to state changes at each associated user interface element, the plurality of user interface operations;
recording, at a cache, the plurality of user interface operations, each of the recorded plurality of user interface operations having a predefined format including a value and a target;
receiving, at a user interface controller and from a remote server, an indication of a type of compression algorithm for compressing the plurality of user interface operations stored in the cache;
compressing, in response to the received indication, a first user interface operation of the plurality of user interface operations stored in the cache and a second, subsequent user interface operation of the plurality of user interface operations stored in the cache by deleting the first user interface operation when the first user interface operation does not affect a final value of a corresponding target;
moving, in response to a first request triggered by a first selection at the user interface to move to a prior display state at the user interface, back in the cache to determine a prior state for presentation at the user interface, wherein the prior state for presentation at the user interface comprises one of the plurality of user interface operations stored in the cache, and wherein the moving back in the cache to determine the prior state for presentation at the user interface occurs after the compressing; and
moving, in response to a second request triggered by a second selection at the user interface to move to a subsequent display state at the user interface, forward in the cache to determine a subsequent state for presentation at the user interface, wherein the subsequent state for presentation at the user interface comprises one of the plurality of user interface operations stored in the cache, and wherein the moving forward in the cache to determine the subsequent state for presentation at the user interface occurs after the compressing.

7. The system of claim 6, wherein the user interface controller monitors the plurality of user interface operations being performed.

8. The system of claim 6 further comprising:
providing, by an event listener, the monitored plurality of user interface operations to the cache.

9. The system of claim 6, wherein the cache comprises an array where the plurality of user interface operations are stored.

10. The system of claim 6, wherein the target represents a user interface element, the value being entered into the user interface element.

11. A non-transitory computer-readable medium including program code which, when executed by at least one processor, causes operations comprising:
monitoring, at a user interface controller, a plurality of user interface operations performed at a user interface, wherein the user interface controller comprises a plurality of event listeners, wherein each event listener of the plurality of event listeners is associated with a user interface element of the user interface, and wherein the monitoring comprises producing, by the plurality of event listeners and in response to state changes at each associated user interface element, the plurality of user interface operations;

recording, at a cache, the plurality of user interface operations, each of the recorded plurality of user interface operations having a predefined format including a value and a target;

receiving, at a user interface controller and from a remote server, an indication of a type of compression algorithm for compressing the plurality of user interface operations stored in the cache;

compressing, in response to the received indication, a first user interface operation of the plurality of user interface operations stored in the cache and a second, subsequent user interface operation of the plurality of user interface operations stored in the cache by deleting the first user interface operation when the first user interface operation does not affect a final value of a corresponding target;

moving, in response to a first request triggered by a first selection at the user interface to move to a prior display state at the user interface, back in the cache to determine a prior state for presentation at the user interface, wherein the prior state for presentation at the user interface comprises one of the plurality of user interface operations stored in the cache, and wherein the moving back in the cache to determine the prior state for presentation at the user interface occurs after the compressing; and moving, in response to a second request triggered by a second selection at the user interface to move to a subsequent display state at the user interface, forward in the cache to determine a subsequent state for presentation at the user interface, wherein the subsequent state for presentation at the user interface comprises one of the plurality of user interface operations stored in the cache, and wherein the moving forward in the cache to determine the subsequent state for presentation at the user interface occurs after the compressing.

* * * * *